April 28, 1964  A. W. RAFFERTY  3,130,550
REMOTE CONTROL MECHANISM
Filed March 7, 1960
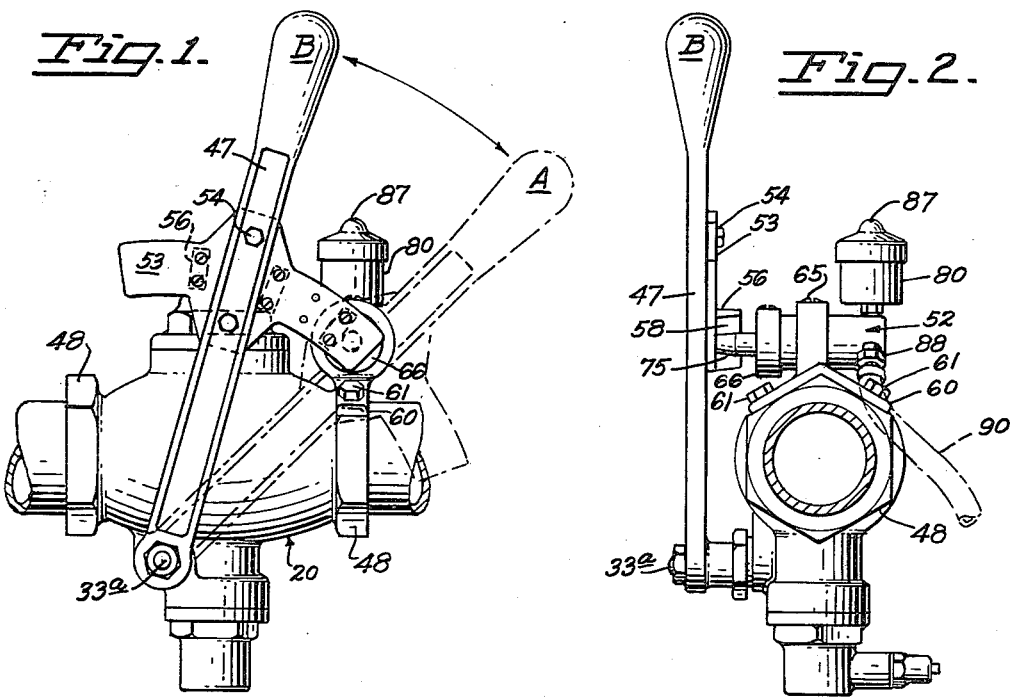
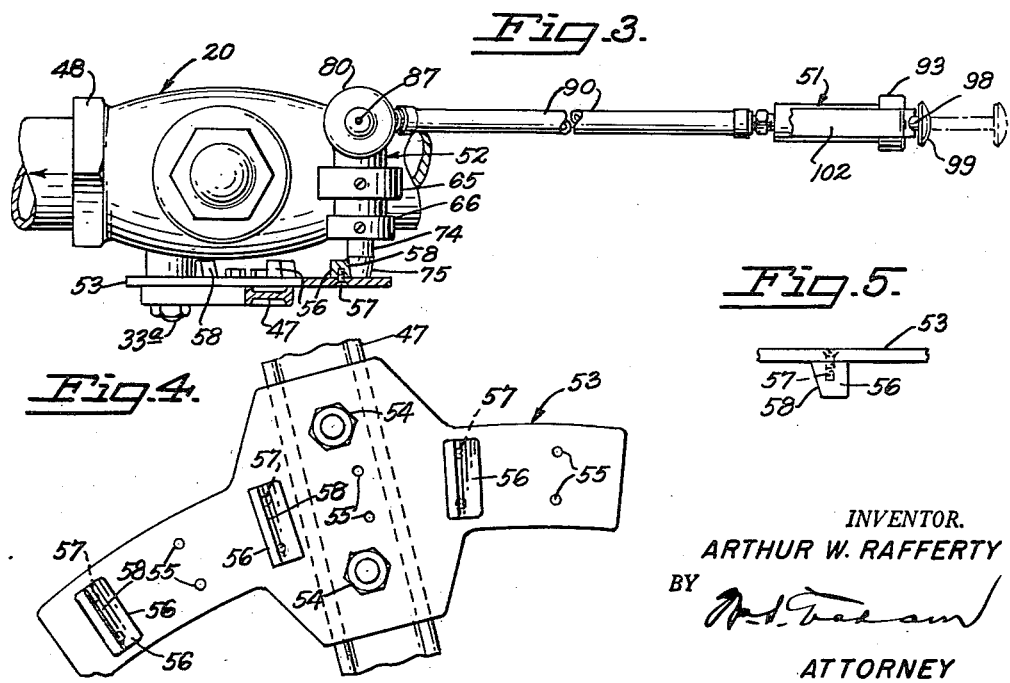
INVENTOR.
ARTHUR W. RAFFERTY
BY
ATTORNEY

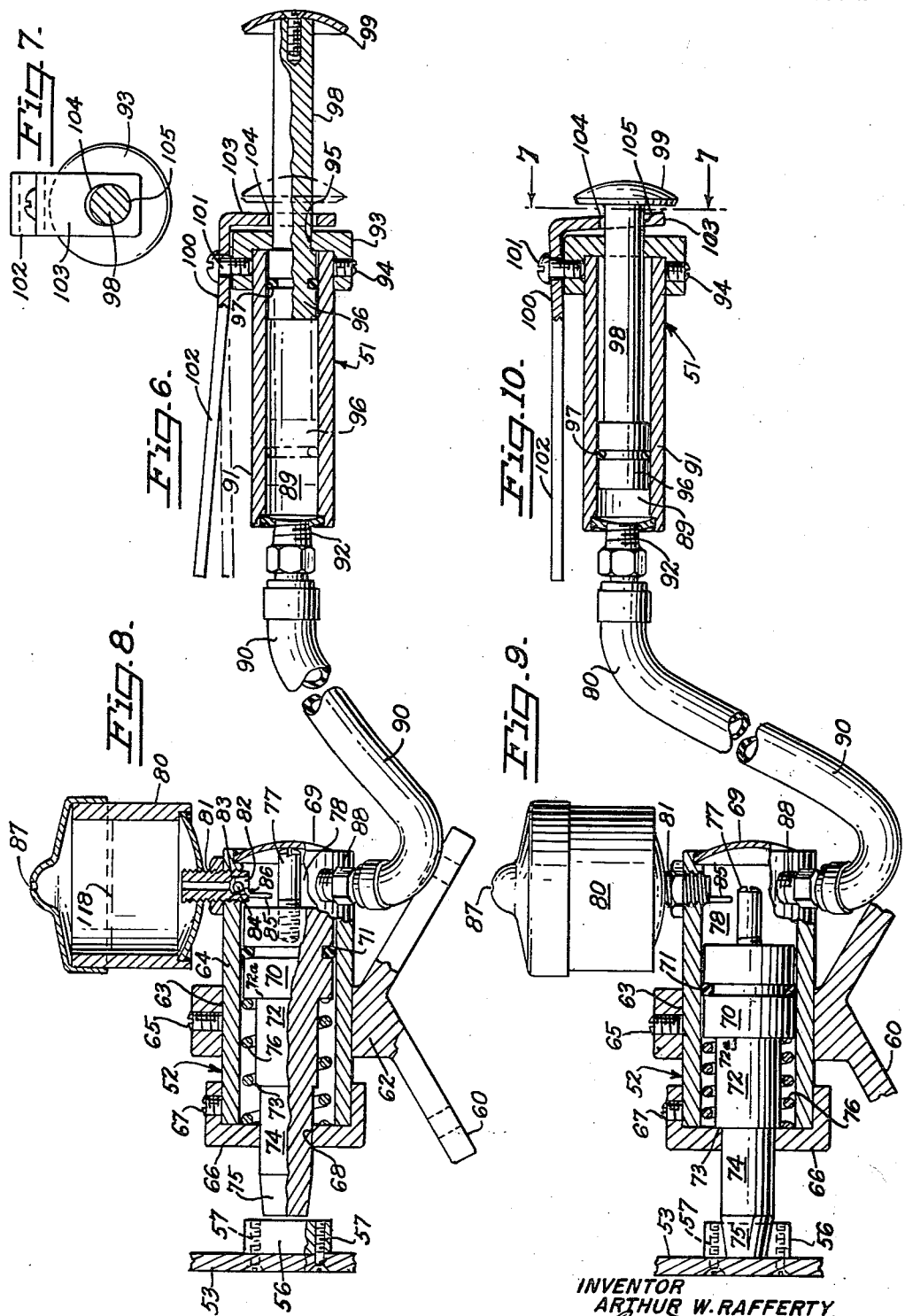

April 28, 1964
A. W. RAFFERTY
3,130,550
REMOTE CONTROL MECHANISM
Filed March 7, 1960
4 Sheets-Sheet 3
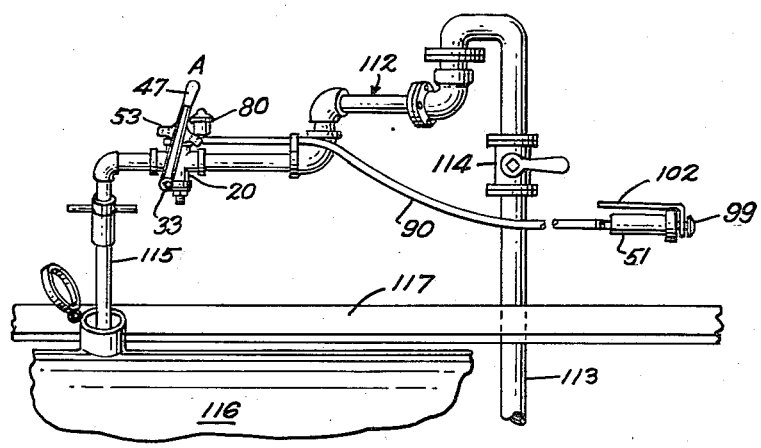
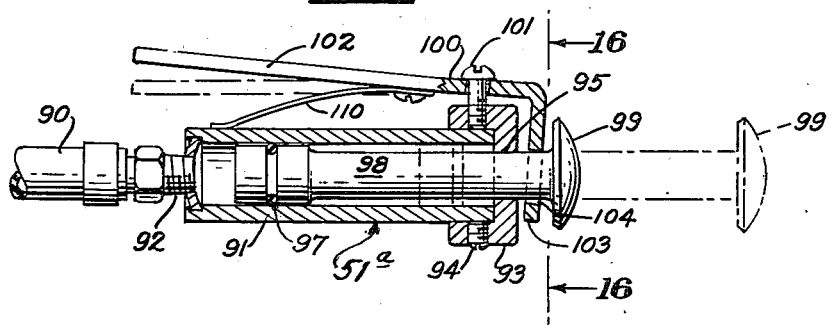
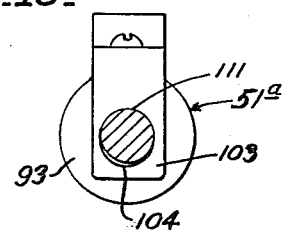
INVENTOR.
ARTHUR W. RAFFERTY
BY
ATTORNEY April 28, 1964
A. W. RAFFERTY
3,130,550
REMOTE CONTROL MECHANISM
Filed March 7, 1960
4 Sheets-Sheet 4
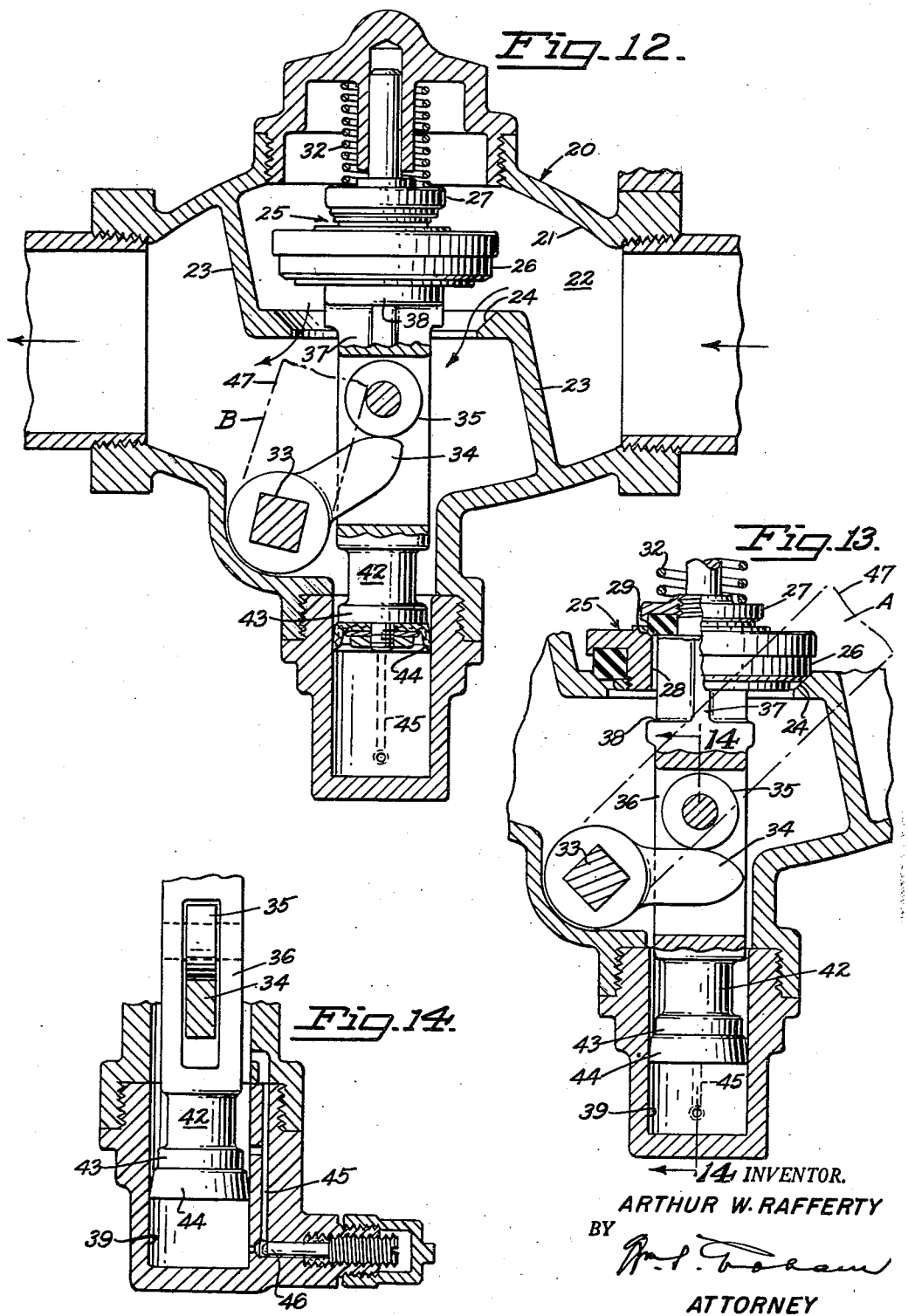
INVENTOR.
ARTHUR W. RAFFERTY
BY
ATTORNEY United States Patent Office 3,130,550
Patented Apr. 28, 1964

3,130,550
REMOTE CONTROL MECHANISM
Arthur W. Rafferty, 933 3rd Ave., Sacramento, Calif.
Filed Mar. 7, 1960, Ser. No. 13,246
6 Claims. (Cl. 60—54.5)

This invention relates to remote control mechanism, and more particularly relates to remote control devices for selectively locking and releasing a self-biased control member which per se may control a flow conduit, or for other purposes. More especially, the invention relates to means for remotely controlling self-biased control members which are automatically biased to a closed position when not intentionally maintained at an open position by the remote control mechanism.

One advantageous employment of the invention may be exemplified in relation to a remote control for a self-closing valve in a flow conduit in the petroleum or chemical industries, since special problems are present in controlling flow valves in such industries.

The internal flow valve mechanism and the opening and self-closing means per se may be of any suitable conventional type in which a locking means may be included as an element of the self-closing means, illustrative only of one suitable form of valve structure in which the invention of the remote control apparatus may be employed, such illustrated valve being of a type employed as a loading valve in the petroleum industry.

The petroleum industry affords a suitable example for statement of one use of the invention, because in that industry motor and airplane fuels, with additives such as tetraethyl lead have in more recent years become many times more volatile, and delivery rates of flow have been greatly increased. Under such conditions these volatile products generate harmful toxic and dangerously explosive fumes in close proximity to the discharge into a receiving vessel. Such fumes injuriously affect persons who necessarilly inhale them in close proximity to the loading operation. Such loading operations are generally performed with a self-closing valve, or what is sometimes called a "deadman" valve, which remains open for flow only so long as manually maintained open, and is mechanically designed to close automatically when not manually held open. But because of such volatile fumes it sometimes happens that an operator, in order to avoid such fumes, will indulge in the dangerous practice of blocking such a valve at open position and retire to a more remote station with intention to return to the valve when the receptacle or tank is near its filled condition, which obviously negatives the precautionary use of the self-closing or deadman valve, and may cause dangerous and wasteful overflow of the highly volatile inflammable liquid, as well as loss of the monetary value.

Another advantageous employment of this remote control device of the present invention may be exemplified in loading or filling operations in inclement or very cold weather such as Arctic conditions wherein an operator may control the flow valve from a remote protected booth or shed.

Broadly, the objects of the present invention are to provide a remote control device for other self-closing control devices, and allowing a reasonable mobility to an operator; to provide a manually operable remote control device operated hydraulically; to provide for such convenience and ease of operation that any inducement for an operator to leave a flowing conduit unattended is minimized; to provide for maintenance of uniformity of hydraulic pressure in the remote control apparatus; to provide for self-closing of the control means; to provide for elimination of trapped air in the hydraulic system of the remote control device; to provide for ease of operation of control between a fully open and a partially closed position of operation of the flow conduit; to provide a control apparatus which may be adjusted in position of mounting for use on mechanism of varying sizes and capacities of flow; and generally to simplify and improve upon remote control devices for resiliently self-biased members.

With the foregoing and other objects in view, as will more fully appear from the following specification, one preferred form in which the invention may be embodied is described herein and illustrated in the accompanying drawings which are made a part hereof.

In the drawings:

FIG. 1 is a side elevational longitudinal view of a self-closing flow valve, illustrative of an environment for the invention and a portion of its parts.

FIG. 2 is an end view of FIG. 1 as viewed from the right-hand end of FIG. 1.

FIG. 3 is a top plan view of FIG. 1, a handle member being broken away, the view also including an actuating plunger mechanism.

FIG. 4 is an enlarged fragmentary detail of a face elevation view of a quadrant stop means as shown in FIGS. 1 and 3, the view being the reverse face thereof as shown in FIG. 1.

FIG. 5 is a top detailed view of a portion of FIG. 4 including a stop lug member.

FIG. 6 is a longitudinal vertical central section view of actuating plunger means shown in FIG. 3, a plunger piston being shown at retracted position.

FIG. 7 is a transverse sectional view on line 7—7 of FIG. 10, and showing the actuating plunger piston at a locked position.

FIG. 8 is a longitudinal vertical central section view of assembly of relay operating mechanism at a normal position when the self-biased controlled member is released responsive to retracted position of the plunger piston shown in FIG. 6.

FIG. 9 is a longitudinal vertical central section view of assembly of relay operating mechanism at operative position when the controlled member is being held at an open position responsive to depressed position of plunger piston as shown in FIG. 10.

FIG. 10 is a longitudinal vertical central section of actuating plunger means shown in FIG. 6 with plunger piston shown at depressed position.

FIG. 11 is a schematic view of one exemplified environment of operation of the invention.

FIG. 12 is an enlarged longitudinal vertical central section of valve apparatus shown in FIG. 1 at an open position of flow, and showing in broken lines the position of a handle member when a remotely controlled valve is open.

FIG. 13 is a fragmentary vertical sectional view of a portion of valve apparatus shown in FIG. 12, at a closed position of the valve and showing in broken lines the position of a handle member which may be remotely controlled for closing the valve.

FIG. 14 is a fragmentary view of a portion of exemplified valve apparatus on line 14—14 of FIG. 13.

FIG. 15 is a modified form of actuating plunger mechanism, shown in longitudinal vertical central transverse section.

FIG. 16 is a lateral transverse section of line 16—16 of FIG. 15.

Referring to the drawings in which like reference characters indicate corresponding parts in the several views, 20 indicates generally a self-closing valve apparatus as an exemplification of utility of the invention, the direction of flow therethrough being indicated by arrows in FIG. 12. While the invention is adapted for operation in many conventional types of resiliently self-biased mechanisms, a brief description of the exemplified flow valve illustrated herein serves to illustrate adequately the structure and operation of the invention.

The valve housing is indicated 21 having a flow chamber 22 which is divided by a partition wall 23 in which there is a valve opening and seat 24, the flow through the valve opening being controlled for opening and closing by a suitable valve member generally indicated 25 such as the illustrated compound poppet type, which has a major valve body 26 and a minor or smaller valve body 27, the major valve body having centrally therethrough an opening 28 and valve seat 29 upon which the minor valve body seats. The valve poppets 26, 27, are normally maintained seated and closed (as shown in FIG. 13) by means of an expansion tension spring 32 of relatively high compression value, and are opened against the expansive tension of the spring by a transverse rockable cam or tappet shaft 33 having extended therefrom within the housing a tappet cam 34, the opposite free end of the cam bearing against a follower roller 35, the cam being thus operable by rocking of the shaft 33 to selectively raise and lower a reciprocable yoke frame 36 within which the roller 35 is rotatably mounted. It will be here noted that shaft 33 has an end 33a extending through a suitable bearing in the housing wall for engagement by an operating handle 47 which is ultimately resiliently biased to a closed position of the valve by spring 32 as will be further described. The end of the yoke frame 36 adjacent to the poppets mounts valve stem 37 of relatively normally disposed ribs at the outer end of which is mounted the minor valve poppet 27 which is therefore opened directly and positively by the cam, being the first of said poppet bodies to open responsive to the raising of the yoke frame by cam 34. The larger or major valve poppet 26 movably floats on the valve stem 37 and is lifted to open secondarily by a radially extended shoulder 38 when the yoke frame is raised by the cam. In closing the valve by lowering cam 34 the major valve body 26 closes first and the minor valve body 27 follows to its seat 29, responsive to both the expansion of spring 32 and the pressure of liquid flow. When the valve is closed the shoulder 38 is spaced from poppet 26. Such a compound valve and seat mechanism greatly facilitates the smooth operation of the valve and reduces hydraulic shock in the flow line by opening and closing the valve in a two-stage operation.

To further facilitate the smooth and equalized seating of the valve members 26, 27, a dash pot or hydraulic snubbing means may also be provided at the end of the valve housing which is opposite to the compression spring and the major and minor poppet members. This hydraulic snubbing means comprises a dash pot cylinder chamber 39, and the reciprocating yoke frame 36 mounts integrally at its end adjacent the dash pot chamber, a piston-shaft continuation 42 of the yoke frame. At its free end said piston shaft provides a piston 43 including a radially expansive sealing gland 44 snugly reciprocable in the dash pot cylinder in unison with the yoke frame 36 and the poppet valve members. A by-pass tube 45 is provided in the wall of the valve housing communicating between the flow chamber 22 and the lower end of the dash pot cylinder below the piston 43. The flow through this by-pass tube may be suitably regulated by a needle valve 46 of any suitable type.

The valve is manually opened for flow against the expansive tension of spring 32 by means of a lever or handle 47 mounted on the end 33a of the rockable shaft 33, the latter having a suitably keyed end mating with the end of the handle for that purpose whereby the lever handle swings in a plane radial to the axis of said shaft 33. The amplitude of arc of movement of the handle is exemplified as approximately 30 degrees, as best shown in FIG. 1. The handle 47 when spring-biased to closed position of valve is shown in broken lines in FIGS. 1 and 13, and the position of the handle 47 at the fully opened position of the valve is shown in full line in FIGS. 1 and 2, as well as being shown in broken lines in FIG. 12.

For the purpose of mounting the remote control apparatus of the invention upon the valve housing, it is to be noted that it is a generally recognized practice to provide an internally threaded end portion to the valve housing, such as the illustrated hexagon terminal end portion or nut 48 at each end of the housing of such flow valves so that the valve may be readily mounted to suitable tubular flow pipes. As herein exemplified the remote control device of the present invention utilizes such hexagon end portion of the housing as the base for a bracket 60 which slidably mounts and supports the operating portion of the control apparatus axially adjustable on the valve housing, although any other suitable form of bracket and mounting may be employed.

The remote control apparatus per se includes an actuating assembly unit generally indicated 51, and a relay operating assembly unit generally indicated 52, as best shown in FIGS. 6, 8 and 9 and 10, the relative positioning of FIGS. 6 and 8 representing the operative positions of the actuating assembly 51 and the relay operating assembly 52 when the flow valve is closed, and FIGS. 9 and 10 represent the position of those parts when the flow valve is maintained open.

Accessory to the operating assembly 52, the handle member 47 of the flow valve has an elongated arcuate quadrant stop member 53 mounted thereon as by bolts 54, the quadrant member being intermediately spaced between the mounted end of the handle on rocker shaft 33 and the terminal free end of the handle, whereby the quadrant swings in the arc of the movement of the handle. This quadrant member 53 has a plurality of arcuately relatively spaced holes 55 bored therethrough at such predetermined positions as experience may prove desirable to stop the movement of the handle. Mounted securely but releasably interchangeably in these holes of the quadrant member are stop lug members 56 which are releasably secured by screws 57. Manifestly, therefore, the stop lugs swing in an arc with the quadrant when the handle is rocked on shaft 33. In general, the stop lugs 56 are mounted perpendicular to the arc of the quadrant and are at the face thereof which is opposed to the flow valve housing. Preferably each of such stop lugs has a face 58 which is inclined for contacting a correspondingly inclined face of a keeper bolt portion of a hydraulically-urged relay piston shaft of the operating assembly 52, as will be described.

In the operating assembly 52, it has been stated that there is usually a bracket-mounting portion 48 at each end of a flow valve housing. A bracket 60 is provided having legs at its base straddling an apex angle of the hexagon portion 48 and securely bolted thereto at 61, the bracket having integral therewith a slide bearing 62 having a cylindrical opening 63 therethrough in direction laterally transversely of the axis of the flow through the flow valve.

Adjustably slidably mounted coaxially in the cylindrical opening 63 of the bracket there is a tubular operating cylinder 64, the operative position of which is stationary in the sense that it is not freely movable from place to place, and it is stabilized against casual axial movement by set screws 65, which may be loosened for selective adjustment of the operating cylinder axially forwardly or rearwardly. Thus one end of the operating cylinder is adjacently spaced from the lever handle 47 and quadrant 53 and is axially adjustable relative thereto and to the plane in which the lever and quadrant swings upon shaft 33, such adjustment being desirable to adapt a single size of the control operating apparatus to valves of varying capacity, or body-size or shape. The offsetting of the slide bearing 62 from the true apex of the supporting bracket 60 (as best shown in FIGS. 2 and 8) being intended to allow and provide for a somewhat greater length of axial adjustment of the cylinder 64 to accommodate larger sized valves in which the handle and quadrant may be spaced a greater distance from the axis of the valve housing.

The end of the operating cylinder 64 which is adjacent to the quadrant is closed by a suitable cap 66 tightly secured by set screw 67, and axially centrally of the cap there is an opening 68 for snugly and slidably receiving therethrough the keeper or bolt portion of a piston shaft as will be described. The opposite end of the cylinder is tightly closed by any suitable capping means 69.

A hydraulically operated piston 70 is mounted slidably in the cylinder 64, having a suitable packing gland 71 for proper sealing against passage of fluid thereby. At one of its ends this piston member 70 has a coaxially extended integral shaft which moves with the piston and comprises an intermediate shaft portion 72 of lesser diameter than the piston providing a piston-shoulder 72a; said shaft also having a stop-shoulder 73 intermediate its ends and an extension lock bolt 74 which is snugly slidable in the opening 68. The terminal end portion 75 of the bolt is preferably conically tapered to a nose which cooperates with the inclined faces 58 of the respective stop lugs 56 to facilitate sliding engagement and disengagement therebetween.

Within the operating cylinder 64 and circumferentially of the intermediate shaft and bolt portions 72, 74, is a compression coil spring 76 under compressed tension between the end closure 66 and the shoulder 72a of piston 70 and urging the piston towards the opposite end of the cylinder. The excursion stroke of the piston towards said opposite end may be adjusted by a suitably extended threadedly mounted pin 77 at the opposite end of the piston for the purpose of controlling the spacing of the piston from the adjacent end closure 69, and thereby providing an operating hydraulic pressure chamber 78. It will be manifest that the tension of spring 76 continually urges the piston toward the hydraulic chamber and that such movement of the piston is limited by the regulating pin 77.

Communicating with, and normally at an upper portion of the hydraulic chamber 78 is a hollow reservoir injector cup 80 mounted by means of threaded tubular nipple 81, the tube at the end of the nipple which opens into the hydraulic chamber 78 having an inverted valve socket 82 provided with a tapered seat 83. A ball check 84 is mounted in the socket and is adapted to open and close the tube of nipple 81. A capillary finger or rod 85 is secured at one point to the edge wall of the socket 82 and has an extension 86 leading into the socket and thereby supporting the ball check adjacently spaced from the conical seat. The opposite end of the capillary rod 85 is extended freely into the hydraulic chamber 78 as a guide and drip-pin for a fluid that flows from the injector cup into the operating cylinder. The remainder of the body of the injector 80 is closed and has a top cover provided with breather vent 87 in the top wall.

A hose connection 88 is provided in communication with the hydraulic chamber 78 preferably at the side thereof removed from and preferably substantially opposite relative to said injector cup nipple 81.

From the hose connection 88 a flexible high pressure tubular hose 90 extends from the operating assembly 52 to the actuating assembly 51, the length of hose being sufficient to permit an operator to function at a position spaced substantially from the flow valve, such as a distance of from 10 to 12 feet, and reasonable mobility for operation.

The actuating assembly unit 51 comprises a hollow hydraulic pressure cylinder 91 within which is an actuating hydraulic pressure chamber 89 preferably of lesser diameter than the diameter of the relay operating pressure chamber 78, a diameter ratio of approximately 2 to 1 being illustrated as satisfactory and efficient. The hose 90 has communicating connection with an end of the pressure chamber 89 and is secured thereto by nipple 92. The opposite end of the actuating cylinder is closed by a closure cap 93 suitably fixed by set screw 94, the closure cap having an axially central opening 95 therethrough. A piston 96 is slidably mounted in the actuating pressure chamber 89, having suitable sealing ring 97 and also having a manually depressible cylindrical plunger rod 98 extending outwardly through the closure cap opening 95, the plunger rod being provided with a suitable pressure button 99 at its outer free end. It will be noted that while the actuating pressure chamber 89 has a lesser diameter than the relay pressure chamber 78, the piston 96 in acuating chamber 89 is relatively short and its excursion within the cylinder is relatively longer than that of the relay piston 70 (as shown by broken lines in FIG. 6), thereby providing displacement of sufficient fluid to operate the piston 70 in the larger cylinder against the expansive tension of spring 76 by a comparatively reduced manual pressure of the plunger rod 98, a theory believed to be supported by what is generally termed Pascal's Theoreum of Hydraulic Pressure.

Means are provided for releasably manually maintaining the actuating piston 96 at its depressed position against the reverse expansive pressure of spring 76 so that it will not be necessary for an operator to continually hold the plunger rod 98 at its depressed position directly against such tension, such a means comprising an elongated leverage lock bar or friction ratchet member 100 mounted adjacent one of its ends on the outer circumference of the closure cap 93, by means of a threaded screw bolt fulcrum 101 for rocking with a suitable degree of looseness. This leverage friction ratchet has at one side of said fulcrum an elongated lever portion 102 substantially parallel with and sufficiently spaced adjacent to the actuating pressure cylinder 91, so that the lever and cylinder may be conveniently held in one hand of an operator. The opposite end of the leverage friction ratchet is turned substantially normally around the outer end face of the end closure 93 and thereby provides a friction ratchet plate 103 having adjacent its end an ovoidal shape friction ratchet opening 104 through which the cylindrical plunger rod 98 normaly passes freely with clearance for sliding therethrough, the plunger rod being frictionally and releasably lockable at its depressed inward position shown in FIG. 10 by the frictional engagement of the edge portion 105 of the ratchet opening thereagainst responsive to manual pressure on the lever portion 102, as shown in FIG. 7.

Referring to the modification shown in FIG. 15, there are situations wherein it may be desirable to operate the ratchet locking means of the actuating assembly means 51 in a reverse manner, such as in the operation of filling very large storage tanks of great capacity, wherein it would be undesirable and inconvenient for an operator to be compelled to manually hold down the lever of the friction ratchet for a long period of time, sometimes extending for an hour or more.

Therefore, in FIG. 15 there is disclosed a modified form of an actuating assembly generally indicated 51a in which the structural parts of the pressure cylinder and piston are the same as in FIGS. 6 and 10, and are identified by similar reference characters where the parts correspond. The modification is in the operation of the friction ratchet. In this modification the friction ratchet is rockably mounted adjacent one of its ends to fulcrum on the end closure member 93 by means of the headed screw bolt 101, a lever portion 102 extending forwardly of the fulcrum and the relatively normal ratchet plate 103 overlying the end closure member. The slightly ovoidal opening 104 in the ratchet plate is aligned with the opening 95 in the end plate, and the plunger rod 98 of the piston is slidable through both of said openings. The modification of FIG. 15 includes an elongated flexible leaf spring 110 mounted between the lever 102 and the barrel of the cylinder 91, the spring being tensioned outwardly to press the lever away from the cylinder 91. Such outward spring tension engages the edge 111 of the friction ratchet opening 104 against the plunger rod of the piston and thereby locks it at an inward or depressed position which is the hydraulic-pressure position and thus operates to hold the flow valve open. To release the plunger rod from such locking engagement it is only necessary to press the lever 102 against the spring 110 whereupon the pressure piston 96 and its plunger rod 98 return to the outward or normal position responsive to the expansive force of spring 76 in the operating assembly 52, hydraulically transmitted through the hose 90.

In operation it is to be assumed that there is an adequate supply of fluid in the liquid system of the control apparatus to normally fill the hydraulic chamber 78, the hose 90 and the fluid chamber forwardly of piston 96 in cylinder 91, plus a reasonable reservoir supply of liquid in the injector cup 80.

In such operation reference is first made to the schematic view of FIG. 11 illustrating one example of use of the invention, in which a flow conduit system generally indicated 112 is shown having a series of pivoted swingable communicating conduit arms, including a main line feed 113 in which there is a block valve 114. At the free terminal end of the flow pipe system is a downspout 115 depending into the filling dome of a carrier vessel such as a tank car or tank truck 116. The flow valve is almost universally mounted closely adjacent to the downspout or other suitable outlet whereby an operator is required to remain close to the opening through which the filling is being made, and for this purpose a platform 117 is normally provided. The flow valve 20 is of the self-closing type, that is, it requires manual manipulation of handle 47 from "closed" position A (as shown in broken lines in FIGS. 1 and 13) to an "open" position B (as shown in full lines in FIGS. 1 and 2, and in broken lines in FIG. 12), in order to open the valve. And since it is spring-biased to a closed position of the valve, it requires continual manual holding of the valve open during a flow operation, in the manner hereinabove described. If the valve is not held at open position, the flow is shut off by the automatic closing of the valve poppets 26, 27 responsive to spring 32 supplemented by the pressure flow of the fluid in transit. Therefore, if an operator normally leaves his operating post or becomes physically stricken or incapacitated the valve will automatically close. The problem is to hold such a self-closing valve at open position without subjecting an operator to the toxic and flammable escaping fumes of the volatile liquid, and yet maintain the essential factor of having the flow valve automatically closed if it is not manually held open.

Referring firstly to FIGS. 1 to 14, and starting at closed Position A, the operator, with the actuating assembly 51 in one hand, may manually open or cock the flow valve by moving handle 47 to the open position B, and may then immediately depress the plunger rod 98 and lock it at depressed position by a relatively light pressure on lever 102, thereby engaging friction ratchet 103 with the depressed plunger rod. Having cocked the flow valve open, the substantially simultaneous depression of the plunger rod 98 and piston 96 displaces fluid from actuating cylinder 91 to the hydraulic pressure chamber 78, and the consequent movement of piston 70 compresses spring 76 whereupon the nose 75 of the keeper lock bolt 74 engages back of an inclined face 58 of a quadrant lug 56 and thereby holds the handle and the flow valve at open position as long as the piston 70 is depressed. Since there are a plurality of selectively placed lugs 56 on quadrant 53 the rate of flow through the valve may be selectively altered, either when originally opening the flow valve or intermediately during a filling operation by engaging the locking bolt with any desired lug.

After having cocked the flow valve at the desired open position of flow, the operator while still carrying the actuating asesmbly 51 in his hand and maintaining the flow valve locked open, may leave the valve and the proximity of the fumes, open the block valve 114 and retire to a safe or sheltered position during a filling operation, and continue to maintain the flow valve open by the remote control.

Upon release of pressure on lever 102 and the ratchet engagement of the plunger rod 98, the expansive tension of spring 76 retracts the operating piston 70 and thereby displaces the fluid from hydraulic chamber 78 and through hose 90 for return flow to cylinder 91, thus retracting actuating piston 96 and plunger rod 98, and simultaneously releasing the nose 75 of lock bolt 74 from engagement with a lug 56, whereupon the handle 47 and the poppets 26, 27 of the flow valve are returned to closed position responsive to the expansive tension of the spring 32 of the flow valve, and the apparatus is in position for repeat of operation.

A reasonable reservoir supply of liquid is preferably also maintained constantly in the reservoir injector cup 80, such as indicated by liquid level line 118. When pressure is exerted upon the fluid in the hydraulic pressure chamber 78, either responsive to the actuating assembly 51 or the spring 76, the ball check 82 is thereby seated and closes the opening in nipple 81 so that no additional fluid is pressed into the injector cup. Since the regulating pin 77 limits the movement of the piston 70 toward the chamber 78 there is no fluid pressure against the ball check to maintain it seated and thereby close the nipple when the apparatus is not in operation. Therefore, the ball drops from its seat and is supported adjacent to its seat upon the adjacent end 86 of the capillary finger 85. Consequently, any air which may have accumulated in the hydraulic chamber may escape through the injector cup responsive to its inherent buoyancy and thereupon pass out of the opening 87. Also, thermal expansion of the fluid may expand into the injector cup. Any such air flow or expansion of fluid is of relatively small volume and not sufficient in either volume or pressure to seat the ball check and close the nipple. However, if the fluid in the liquid pressure system should become diminished from very slight leakage or frictional wear, the reservoir of liquid supply in the injector cup will slowly drip sufficient additional liquid into the hydraulic pressure system through hydraulic pressure chamber 78 to supply the deficiency, and the capillary rod or finger 85 serves to both guide such drip and also support the ball check operatively adjacent to its seat.

In the modification of FIG. 15, the operation is identical with the operation heretofore described except that it is more adapted to large filling operations where the dangers of overflow in filling smaller transportation units do not prevail to a substantial degree, and the flow valve may therefore be mechanically maintained open by depression of the piston pusher rod 98 and the mechanical locking thereof by the friction ratchet lock 111 responsive to spring 110, subject to release by pressure on lever 102, whereupon the actuating assembly and operating assembly operate in the same manner as heretofore described to permit the flow valve to automatically close in its usual manner.

Having described the invention what is claimed as new and patentable is:

1. A fluid responsive remote control device of the character described comprising a pivoted spring-biased handle, a plate affixed to one side of said handle, a series of lugs affixed to the outer face of said plate in an arcuate path thereon, said path being concentric with the pivotal point of said handle, an operating cylinder mounted at a stationary position adjacent the path of travel of said lugs, a spring-retracted operating piston in said operating cylinder, a bolt extending from one side of said piston slidably through one end of said operating cylinder and selectively engageable with said lugs, means limiting the outward movement of the bolt from said operating cylinder, a freely movable flexible hose tubing communicating with the other end portion of said operating cylinder, an actuating cylinder connected at one of its ends with the opposite end of said tubing, said tubing being of sufficient flexibility and length to provide free manual manipulation of the actuating cylinder from selective positions substantially removed from the stationary position of the operating cylinder, an actuating piston slidably mounted in said actuating cylinder, a plunger rod extending slidably through the outer end of said actuating cylinder, and latch means carried by said actuating cylinder for releasably maintaining said plunger of the actuating cylinder in selected positions with respect to said actuating cylinder.

2. A device as defined in claim 1 wherein said means for limiting the outward movement of the bolt comprises an enlarged portion of said bolt intermediate its outer portion and its associated piston, whereby a shoulder is formed which is adapted to abut the adjacent end of said operating cylinder upon outward movement of said bolt.

3. A device as defined in claim 1 wherein there is provided a pin mounted axially longitudinally between an end of the piston and an adjacent end of the operating cylinder whereby to provide a hydraulic chamber in the said end portion of said operating cylinder.

4. A device as defined in claim 1 wherein said latch means includes a lever extended substantially parallel to the exterior of said actuating cylinder and is pivoted to one side of the outer portion thereof, said lever having an apertured friction latch plate extending from one end of said lever and encompassing said plunger rod, whereby an operator of the device may manually manipulate both said lever and said plunger rod of the actuating cylinder with one hand.

5. A device as defined in claim 4 wherein a leaf spring is affixed to the inner face of said lever and has its free end bearing against the adjacent portion of said actuating cylinder whereby said latch plate is maintained in a normally latched condition with said plunger rod.

6. A fluid responsive remote control device as set forth in claim 1, and including a bracket having means for mounting the operating cylinder and its bolt axially adjustable with relation to said lugs on said plate.

References Cited in the file of this patent

UNITED STATES PATENTS

| | | |
|---|---|---|
| 1,881,807 | Maurer | Oct. 11, 1932 |
| 2,434,455 | Cantrell | Jan. 13, 1948 |
| 2,531,705 | Schultz | Nov. 28, 1950 |
| 2,638,748 | Miller | May 19, 1953 |
| 2,959,010 | Broden et al. | Nov. 8, 1960 |